(12) United States Patent
Barriga et al.

(10) Patent No.: US 8,261,078 B2
(45) Date of Patent: Sep. 4, 2012

(54) ACCESS TO SERVICES IN A TELECOMMUNICATIONS NETWORK

(75) Inventors: Luis Barriga, Johanneshov (SE); Rolf Blom, Jarfalla (SE); Mats Näslund, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 874 days.

(21) Appl. No.: 12/303,342

(22) PCT Filed: Jun. 9, 2006

(86) PCT No.: PCT/SE2006/050189
§ 371 (c)(1),
(2), (4) Date: Dec. 3, 2008

(87) PCT Pub. No.: WO2007/142566
PCT Pub. Date: Dec. 13, 2007

(65) Prior Publication Data
US 2009/0199001 A1  Aug. 6, 2009

(51) Int. Cl.
*H04L 9/32* (2006.01)
(52) U.S. Cl. ........... 713/171; 726/12; 713/153; 380/277
(58) Field of Classification Search .................. None
See application file for complete search history.

(56) References Cited

U.S. PATENT DOCUMENTS

| | | | |
|---|---|---|---|
| 2006/0195893 A1* | 8/2006 | Caceres et al. | 726/8 |
| 2009/0265554 A1* | 10/2009 | Robles et al. | 713/168 |
| 2011/0007705 A1* | 1/2011 | Buddhikot et al. | 370/331 |

FOREIGN PATENT DOCUMENTS

| | | |
|---|---|---|
| WO | WO 00/69114 A1 | 11/2000 |
| WO | WO 2005/027559 A1 | 3/2005 |

OTHER PUBLICATIONS

3GPP, 3rd Generaton Partnership Project: Technical Specification Group Services and System Aspects; Generic Authentication Architecture (GAA): Generic Bootstrapping Architecture (Release 7). 3GPP TS 33.220 V7.3.0 (Mar. 2006).

* cited by examiner

*Primary Examiner* — Fikremariam A Yalew

(57) ABSTRACT

A method and arrangement is disclosed for providing a user, not previously having an individual subscription with a network operator, with credentials for secure access to network services. The arrangement includes a gateway, associated with a subscription for network services, having means for generating and exporting to a user entity personalized user security data derived from security data related to the subscription. In particular, the derivation of credentials is based on a function that is shared between network and gateway and further conveniently makes use of bootstrapping on keying material from the subscription authentication. Pre-registered user identities are assigned trusted users who, thereafter, can download credentials and authenticate for service access. The invention may be implemented at a public place for providing temporary visitors network access whereby trust may exemplary be established by presenting a credit card.

19 Claims, 8 Drawing Sheets

ACCESS TO SERVICES IN A TELECOMMUNICATIONS NETWORK

TECHNICAL FIELD

Generally, the invention concerns a method and arrangement for providing a user, not previously having an individual subscription with a network operator, with credentials for access to network services.

BACKGROUND

Tamper resistant identity cards have been found to be a very good security token automatically providing security on the access link only requiring a user to know a PIN code. Exemplary identity cards are SIM, USIM, and ISIM. It is noticed that an identity card may be implemented as logic functionality in a physical card such as a UICC card (Universal Integrated Circuit Card) according to the UMTS standard. Mobile operators also find identity cards attractive from business point of view due to their large installed customer base that can be exploited beyond the cellular domain. Thus, there is a general desire to exploit identity cards also outside the mobile networks, e.g. to provide multi-access services, including also fixed broadband accesses (DSL, PON/FTTH, WiMax, WLAN) or even to provide Single-Sign-On services in federated business scenarios.

There are several business drivers behind the non-conventional usage of identity cards, for example to increase the ARPU (Average Revenue per Unit), to increase traffic in the access/transport networks, and to obtain new sources of income due to brokerage towards third party service providers.

For users who already have a mobile subscription, various ways are known to re-use an identity card for other accesses, including fixed access. However, it may be more difficult to re-use identity cards for users who do not have a mobile subscription. A solution with a home gateway is readily thought of. A home gateway would contain an identity card for authenticating the home subscription towards the operator/provider. However, the authentication would be independent of the user working behind the gateway. Moreover, the security association is inside the gateway. Such an arrangement allows trusted users behind the gateway to access the operator services under one single (group) subscription. This approach is currently being applied for providing residential IMS services to households via an ISIM-enabled home IMS gateway.

However, if one of the trusted users leaves the local home network and takes a mobile user entity beyond home network coverage, there is no established user specific security association that can be used to secure new services, e.g. WiMax or WCDMA access, or IMS service etc. A practical example may be a user who changes from 802.3 (LAN) access via the home gateway to 802.16 (MAN) access, e.g. when moving the terminal outside the house into the garden. Relying on known arrangements such a scenario would require a full re-authentication of the user preferably based on a user identity card, e.g. a SIM, USIM, or ISIM module. Thus, no, secure and convenient hand-over is possible. Transferring the already established security association out from the gateway is undesirable from security point of view, since if it happens to be re-used in an insecure access, the security of the gateway, and all users behind it, is also compromised. Even if it would be acceptable from security point of view, it is not possible for the operator to tell which of the users in the home who went outside. Thus, it is not possible to adapt certain services, e.g. to block adult content from being accessed by children.

Indeed, in many cases, a residential gateway contains a NAT server, a firewall, a router, etc, and there is simply no possibility to tell which user is working behind the gateway. In many cases this may be desirable from a security and privacy point of view. However, in other cases it is a disadvantage that group members can not act individually and independently from other group members.

One possibility to solve the problem of distinguishing individual users operating behind a group subscription is to use IMS ISIM allowing the registration of multiple public identities (IMPU) that are associated with a single private identity (IMPI). However, the gateway-dependency problem remains.

There is, further, a growing interest in using an identity module, such as a SIM, USIM or ISIM module, for authentication to various services provided to a network subscriber. Either the network operator provides such services or a third party service provider co-operates to offer service access through the operator network. The Generic Authentication Architecture (GAA) standard (3GPP TS 33.220) describes the security features and a mechanism to bootstrap authentication and key agreement for application security from the 3GPP AKA mechanism. However, a member of a group, such as a family member, working behind a gateway, such as a home gateway, may not be able to individually benefit from the (GAA) bootstrapping and gain access to desired services.

Thus, there is a need to provide individual group members behind, or moving outside range of a home gateway, convenient and individual access to services provided by a network operator. In particular, there is a need to provide mobile users, having no prior subscription with the operator, such access.

SUMMARY

Generally, a method and arrangement is disclosed for providing a user, not previously having an individual subscription with a network operator, with secure access to network services, the arrangement including means for exporting, to a user entity, personalized user security data derived from security data related to a home subscription with an operator of a home network.

The arrangement may comprise a gateway, e.g. a home gateway, having a subscription with a home network operator, and including an identity module implementing a shared key K. Based on the shared key K the gateway can perform authentication, e.g. AKA authentication, with the network whereby a shared key Kx may be calculated e.g. according to the GAA standard.

A user system may consist of a user and at least one user entity that can communicate with the gateway. The user may initially be located behind the home gateway and decide to move outside the realm of the gateway. Thereby, the at least one user entity may switch access, exemplary to a WAN/MAN access, e.g. wireless, to maintain access to network services previously provided through the gateway.

According to the invention, a method is provided for a user, if trusted by the gateway, to download securely, exemplary over a Bluetooth™ connection, from the gateway a security package including a personal user key Kx_ID computed internally in the gateway. The same key Kx_ID may also be derived at the home network. The derivation of the key Kx_ID may use a function $f$ shared between the network and the gateway and applied to at least the key Kx and the network identity, ID, of the individual user.

Thus, the key Kx_ID is personal and linked to a network user identity ID. It is known to request from the network a specified number of identities ID-n, unique in the network, for use in a gateway with e.g. family members or visitors. According to the invention an administrator of the gateway may register at the network a number of such unique identities generated at the gateway exemplary derived from a gateway identity ID_HGW. Whichever the case is, the network operator accepts provisioning of identities in an identities database, e.g. a home subscriber server, HSS. The identities ID-n may be permanently linked in the gateway, for example to family members or temporarily to occasional visitors. Preferably, the linking is through pseudonyms or person names registered at the gateway in a table linking a name with a corresponding network identity ID. In this way a user remains anonymous in the network and only the gateway knows the relation between the reference identity ID and the person assigned that identity.

According to the invention, the network registers the identities ID-n to be associated with the home subscription that the gateway has with a network operator.

Throughout this document the notation *SIM shall denote SIM, USIM, ISIM or any other form of identity card.

Credentials, associated with the home subscription, may be implemented in the gateway in a replaceable security card, such as a *SIM-card, or be an integrated part of the gateway or, alternatively, implemented as a soft identity module in an application environment of a tamper resistant hardware identity card such as a UICC card. The gateway can perform authentication with the network, e.g. a *SIM AKA authentication, whereby at least a shared key Kx is generated. In the remaining of this document *SIM and *SIM AKA will be used to describe various embodiments of the invention, however, shall it be understood that any other implementation of the credentials and method for authentication can equally well be used. In order to simplify the description, without limiting the scope of the invention, it is assumed that the user system consists of one user carrying one user entity, e.g. a mobile user entity.

In case that the user system and network supports the IMS standard the identities ID-A, ID-B . . . may be part of an IMS subscription whereby, for example, the identities may correspond to IMS public identities, IMPU. Otherwise, the identities may exemplary comprise MSISDN identities or any other identities uniquely defined in the network.

The downloading of credentials to a trusted user may use any connection means known in the art including cable, short range radio, or infrared light. The communication between the gateway and a mobile user entity should be made secure exemplary by using an underlying security arrangement.

The gateway may be arranged as a home gateway.

According to the invention a method is provided wherein a mobile user entity presents, in a request message, a user identity ID-A to an access network that processes the request according to message format to retrieve the key Kx_ID-A. The processing further includes determining authentication functionality for performing authentication of user entity for access to network services based on the key Kx_ID-A. Using a message format provides a possibility to select a processing of the message other than the normal processing of a *SIM-card based authentication. An alternative to including said format as a message format, the format information may be provided in a user profile that is checked for each user access.

The downloaded key Kx_ID-A may preferably have a limited lifetime. The key lifetime may be specified independently of a possible lifetime of the key Kx.

Because the network may associate the identity ID-A, presented by the mobile user entity, with the subscription associated with the gateway, any usage of the identity ID-A for service access may be registered on the gateway account, e.g. for charging. Optionally, the invention therefore also provides means for a common billing of the account, and for differentiating the individual users associated with the group subscription.

Besides derivation of a personal key Kx_ID-A for network access, a personal key Kx_NAF_ID-A may be derived there from as a basis for personal user access to a network application function, NAF. The network determines a reference B_TID to the key Kx, e.g. according to the GAA method, and provides the gateway with a copy of the reference. The reference B_TID is included, together with the key Kx_ID-A, in the downloaded security package to a user entity. A user, having established network access, may include the reference B_TID in a service request directed to a network application function NAF with identity NAF_ID. The user entity 270 may use the key Kx_ID-A to compute a key Kx_NAF_ID-A as basis for communication with the network application function NAF. Similar to the GM method, the network application function NAF requests the same key from the network by providing the network with NAF_ID, B_TID, and ID-A, The network may identify format information associated with the request for determining how to process the request. Thereby, the network may extract from the request the components B_TID and ID-A enabling determination of the key Kx, calculation or retrieval of user key Kx_ID-A and further calculation of key Kx_NAF_ID-A that is, thereafter, returned to the requesting network application function NAF. The user entity and the network application function may then establish communication based on the key Kx_NAF_ID-A. The function $f$ that is shared between the network and the user entity may be used for calculation of the key Kx_ID-A. The key Kx_NAF_ID-A is calculated similar to the GAA-specification, however, using the key Kx_ID-A in place of the key Kx as specified in GAA.

A user profile, known in the art, may be associated with the identity ID-A which specifies personalised services.

An arrangement according to the invention comprises a gateway, having a group subscription with a home network operator, the gateway including an identity module implementing a key K shared with the home network. Based on the shared key K the gateway can perform authentication, e.g. UMTS AKA authentication, with the network whereby at least a shared key Kx is calculated e.g. according to the GAA standard. The gateway further includes means for storing user identities ID-A.

Further, a gateway is provided for calculation of individual keys Kx_ID-A . . . based on the key Kx and the identities using a function $f$ shared with the home network. The gateway has means for download of a security package comprising at least an individual key Kx_ID-A to a user entity that connects to the gateway. A security package may constitute a soft identity module implemented at a receiving user entity.

A network node is provided comprising network means for determining from information associated with an access request, that credentials used by a requesting user entity have been obtained from a download and for performing a corresponding processing of the request, means for calculation of the key Kx_ID_A, and means for determining an authenticator for performing authentication based on the key Kx_ID-A.

DETAILED DESCRIPTION

Various exemplary embodiments of the invention will now be described with reference to the attached drawings. However, it is readily understood that the invention encompasses a plurality of alternative embodiments and that the detailed implementation of the invention described here is only given by way of example to provide a thorough understanding of the invention.

The invention assumes a subscription with an operator based on an identity card, exemplary a *SIM card or some other form of "smart card".

To simplify the description we will, in the following, assume that the AKA-process is used for authentication. However, this assumption shall not be taken to limit the scope of the invention as it will be clear that other authentication methods are possible such as, for instance, PKI based authentication, username/password, one-time-password.

Certain embodiments of the invention are described in relation to the GAA structure, However, it is readily understood that the detailed implementation of functions and functional relationships can be made in many other ways.

In particular various embodiments consider the case that a user, previously accessing services through a gateway, is provided with credentials for network and service access as a roaming user. However, it is noticed that even if the user stays behind the gateway, features of the invention are applicable for providing individualized services that require authentication on an individual basis.

Figure 1:
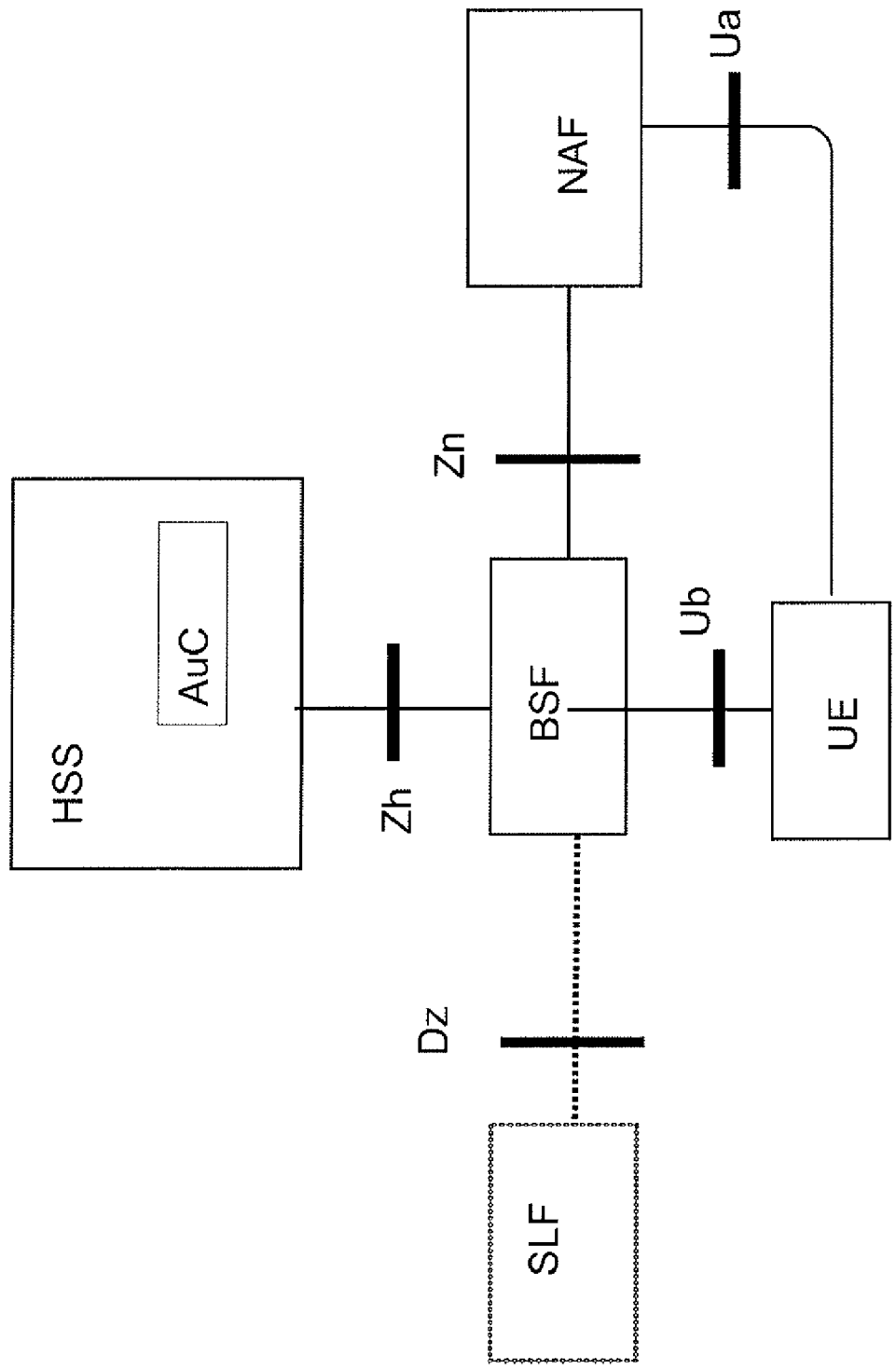
FIG. 1 is a schematic block diagram showing prior art network structure supporting GAA.

FIG. 1 illustrates a network structure according to prior art. In particular, the system shown in FIG. 1 provides support for the Generic Authentication Architecture, GAA (3GPP TS 33.220), characterised by the Bootstrap Server Function (BSF). Shown in the figure is a user entity, (UE) that has an interface, (Ub), with the network function BSF. The entity BSF, in turn, has an interface, (Zh), with a Home Subscriber Server (HSS). HSS can authenticate a user for network access by use of Authentication Centre (AuC). Further HSS stores all user security settings, (USS), exemplary used for control of access to applications.

Also shown is an interface (Ua) between UE and a Network Application Function (NAF) further communicating with BSF over an interface (Zn).

There is also a Subscriber Locator Function (SLF), communicating with BSF over interface (Dz), used to determine the appropriate HSS if there are more than one such unit in the network.

The BSF can perform authentication of a user by the AKA method by requesting an authentication vector, including a random value RAND, from the authentication centre AuC and executing the AKA protocol. In particular, the BSF and the user entity UE can generate key material (Kx) from which an application specific key (Kx_NAF) can be generated that secure the reference point Ua. BSF calculates a reference (B_TID) to the key material Kx and transfers the key to UE. The reference B_TID may have the form of a network address identity as specified in the GAA standard: B_TID= RAND@BSF_domain_name where RAND is the random value basis for the authentication. An application specific key may be requested by a network application function NAF from the BSF using the reference B_TID that may be provided by UE in a user request for services directed to NAF.

Although FIG. 1 illustrates a system that has support for GAA it is well known that authentication for network access generally can be performed with an authentication centre AuC related to HSS.

In a first embodiment of the invention, (UE) in FIG. 1 can represent a gateway, e.g. a home gateway. The gateway serves a plurality of users, e.g. family members and temporary visitors. In particular the first embodiment considers the case that a user, previously accessing services through a home gateway, is provided with credentials for network service access as a roaming user.

Figure 2:
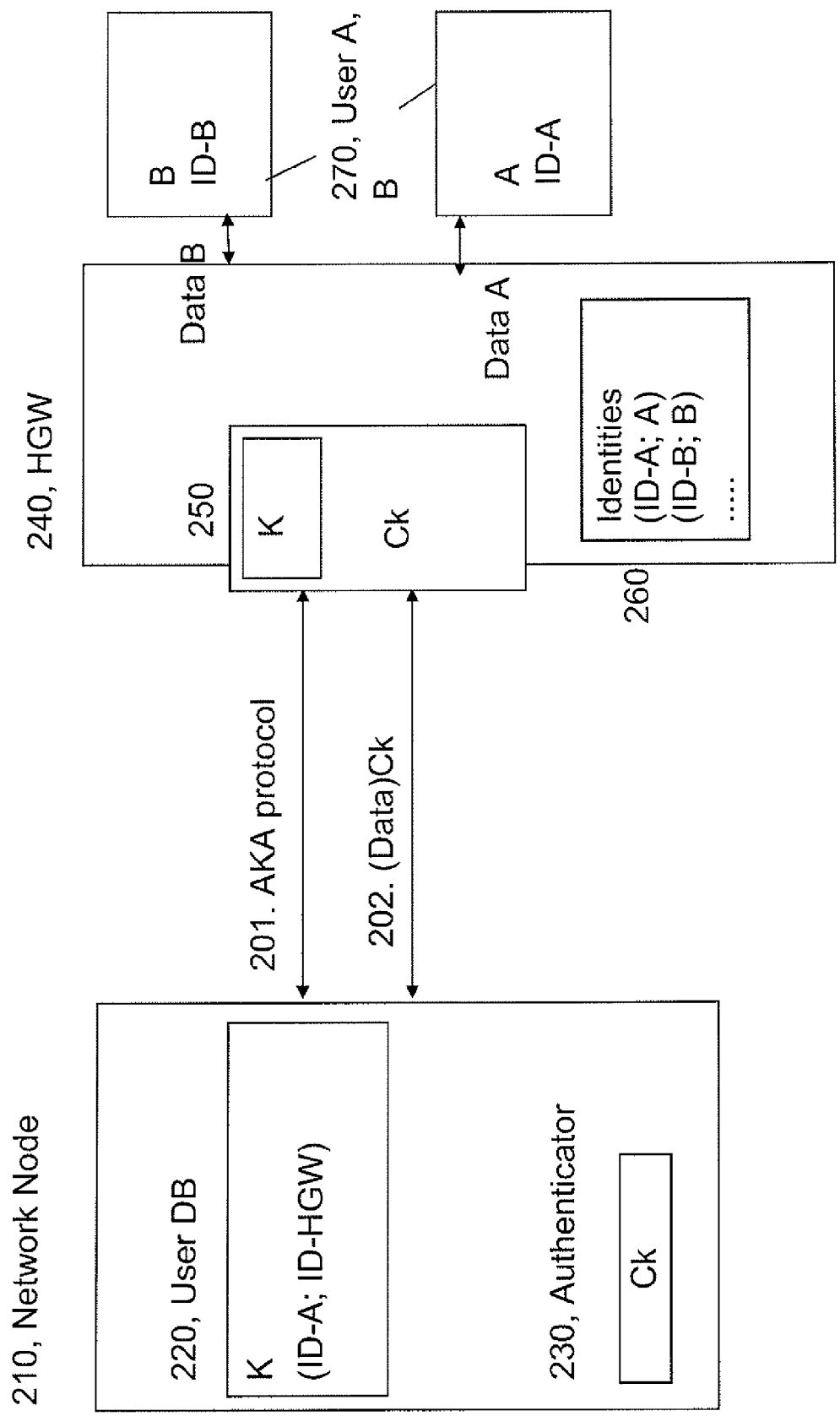
FIG. 2 is a schematic block diagram illustrating the basic principles of the invention.

An arrangement according to the first embodiment is shown in FIG. 2. FIG. 2 illustrates at 210 a network node wherein a user database 220 has user related information such as a key K. Exemplary, the user database 220 may be a Home Subscriber Server HSS. There is further authenticator functionality (230, Authenticator). The authenticator functionality 230 may be implemented in the user database 220, in a Bootstrap Server Functionality BSF according to the GAA standard, in an authentication centre AuC or in some other network entity (BSF and AuC are not shown in the Figure). Further shown in FIG. 2 is a gateway (240, HGW) including a *SIM card 250 implementing said key K shared with the network. An identities database 260 contains registered network identities ID-A, ID-B . . . and their links to user entities (270 A, B . . . ) provided with corresponding network identities ID-A and ID-B. The user entities (User A) and (User B) communicate with the gateway (240, HGW) through any suitable means, e.g. through short range radio such as Bluetooth™, WLAN, by cable, or by infrared light.

The first embodiment will now be described in more detail with reference to FIGS. 2-4.

In order to provide personalised services to members of a community, e.g. a family, several identities ID-A, ID-B . . . may be initially registered to be associated with the gateway subscription. Exemplary ID-A may be an MSISDN or an IMS Public Identity (IMPU) provided by the network and stored in, e.g. the user database 220. Alternatively and according to the invention, an administrator of the home gateway (240, HGW) may provide network functionality, exemplary a user database 220, with identities generated at the gateway. Exemplary network address identity format for registering an identity in an IMS supported system can be:
ID=SIP:<prefix>_person_name@HGW_domain_name Here <Prefix> denotes a format identifier that subsequently can be used by the network as explained later.

A user database (220, User DB), known in the art, may register user identities and their relation with a gateway subscription. For example, in FIG. 2 the relation between the user identity, ID-A, and the gateway identity, ID-HGW, is indicated as (ID-A; ID-HGW). The relation of the identities ID-A . . . to a gateway subscription enables usage of services, e.g. by a family member associated with the identity ID-A, to be registered on the gateway subscription account.

It is known from the GAA standard to map at least one GAA User Security Setting, (GUSS), to at least one such identity ID-A of user A. The User Security Setting GUSS, exemplary located in the user database 220, may include information for use by the authenticator, e.g. relating to key lifetime and type of identity module that the user has.

The gateway (240, HGW) in FIG. 2 preferably includes an identity database 260 for storing the pre-registered identities. Two users, (User A) and (User B) are indicated in FIG. 2 as currently using pre-registered identities ID-A and ID-B respectively. In the case of a stable community such as a family, family members A and B may be permanently linked to the identities ID-A and ID-B respectively. The linking may be registered in the identity database 260 using a family name or pseudonym. Temporary links may be created with visiting users.

The identities ID-A and ID-B are unique within the operator's network and do not reveal any information about the user behind the gateway. It is the home gateway (240, HGW) that protects privacy by mapping the identities ID-A, ID-B . . . to the real user.

The users A and B, respectively, may exchange data, denoted (Data A) and (Data B), with the gateway (240, HGW). The data exchange is preferably over a secure connection that may comprise, e.g., a Bluetooth™ connection, an infrared connection, or a cable connection. Preferably, wireless connections use some security protocol, exemplary WPA (WiFi Protected Access), WEP (Wired Equivalent Privacy), UPnP (Universal Plug and Play protocol). For authentication in a short range communication environment a MANA protocol may be used. In an IP-environment it would also be possible to consider TLS/SSL-based solutions.

At an initial step of registration of identities, the gateway (240, HGW) performs an authentication with the network 210. Exemplary, authentication according to the AKA-protocol is indicated in FIG. 2 at signal exchange 201 using credentials provided in a *SIM-module 250. In particular, the authentication may use a base secret K provided in the *SIM module and shared with the network. As a result of the authentication, at least a key Ck is created at the network, as exemplary indicated at authenticator 230 and at the home gateway (240, HGW) respectively, by an algorithm using as input a random value RAND and the key K. The key Ck is thus related to the gateway, (240, HGW), and may thereafter be used at 202 to protect data exchange between the network and the gateway (240, HGW).

According to the first embodiment of the invention a user, e.g. a family member is provided with credentials for network access. Exemplary, the credentials are provided in a soft identity module implemented as software in a mobile user entity or, alternatively, as an application in an identity module, capable of loading several applications, e.g. a UICC card.

Figure 3:
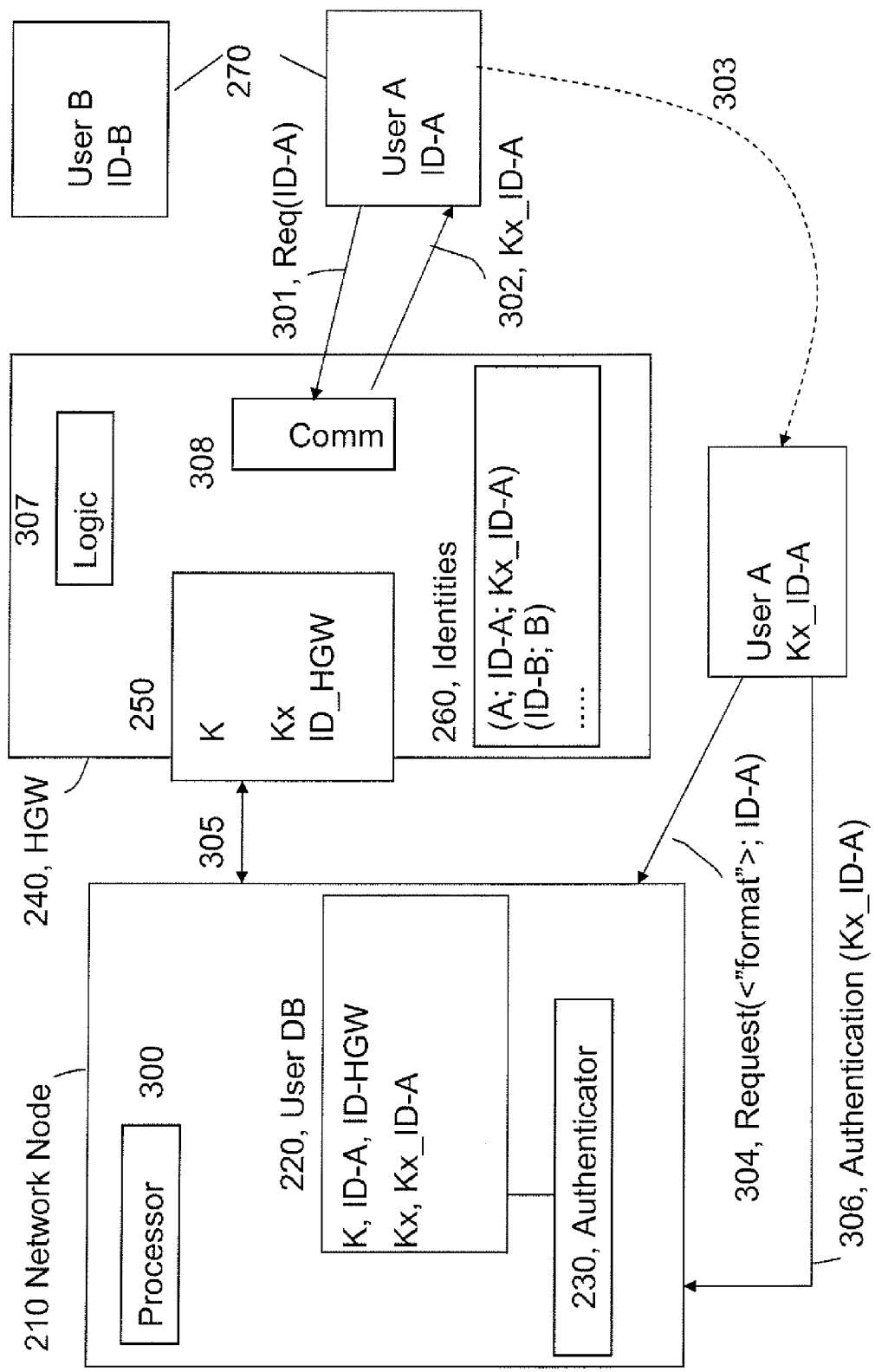
FIG. 3 is a schematic block diagram showing a first embodiment of the invention.

We now refer to FIG. 3 for further details related to generation and use of credentials according to the first embodiment of the invention. Like entities in FIG. 2 and FIG. 3 correspond.

In FIG. 3, at the time of registration of identities ID-A, ID-B . . . , the network and the gateway 240 initially generates a first key Kx. Exemplary, the generation may be based on output from an AKA authentication whereby, in the case of a SIM-based subscription with the gateway (240, HGW), Kx=Kc the ciphering key and, in the case of a USIM-based subscription, Kx=Ck||Ik where Ck is the ciphering key and Ik the integrity key.

The network and the gateway (240, HGW) store the currently valid Kx exemplary in a database 220 respectively in a *SIM card 250.

According to the invention, based on the key Kx, a user key Kx_ID-A is calculated by applying a function $f$, shared between the network (210) and the gateway (240, HGW), such that Kx_ID-A=$f$(Kx, ID-A, "data") wherein "data" represents any additional parameters included in the calculation. The key Kx_ID-A may be calculated for each identity ID-A . . . at the time of authentication. The key Kx, generated in the authentication, may be pre-stored and linked to the identity ID-A and to the identity of the gateway ID_HGW, exemplary in a link table in the user database (220, User DB) as illustrated in FIG. 2. A life-time of the key Kx_ID-A can be defined that is independent of any life-time of the key Kx.

Alternatively, the key Kx_ID-A may be generated from the key Kx at the network in receipt of a request for access as will be described later. In this case, the life-time of all keys Kx_ID-A . . . will depend on the life-time of the key Kx.

At 301 the user (User A) requests credentials at the gateway 240. The user (User A) may have received a pre-registered identity ID-A in a previous registration at the gateway or the gateway assigns an identity in response to receiving the request, i.e. creates the link (A; ID-A) as indicated in the identities database 260. The gateway (240, HGW) thereafter retrieves the key Kx exemplary from the *SIM card and applies the function $f$ to calculate the key Kx_ID-A=$f$(Kx, ID-A, "data"). Alternatively, the gateway retrieves a pre-calculated key Kx_ID-A exemplary from an identities database 260. The function $f$ may, for example, be a cryptographic one-way hash function.

In case that the key Kx_ID-A is pre-stored it is conveniently included in said link table (A; ID-A, Kx_ID-A). The key Kx_ID-A is, according to the invention, basis for further personalised access to network services. However, due to the linking at the network of identities ID-A to the gateway subscription, as indicated at the user database 220, any such access may also be related to the gateway subscription.

The request at 301 may first initiate re-authentication whereby a fresh key Kx, e.g. Ck, is generated as basis for the network and the gateway (240, HGW) to calculate the key Kx_ID-A.

At 302 the key kx_ID-A is downloaded to the user terminal (270, User A) possibly including the assigned identity ID-A.

At 303 the user (User A) moves outside range of the gateway (240, HGW) and at 304 the user (User A) requests network access providing the identity ID-A. According to the invention, the request 304 may include an identifier, <"format">, such that the network may determine if the user has a normal identity module or is using downloaded credentials, e.g. a downloaded soft identity module.

The network node 210 processes the request according to the format identifier, <"format">, and retrieves the key Kx from the database 220 as basis for an authentication of the user.

According to the processing, the network node 210 applies the function $f$ to calculate the key Kx_ID-A $f$(Kx, ID-A, "data").

Alternatively, the key Kx_ID-A is pre-calculated at authentication between network and gateway and pre-stored exemplary in the user database 220 where it can be referenced by the identity ID-A.

The network and the user entity now shares a common key, Kx_ID-A, enabling mutual authentication using this key, or a key derived there from using a shared algorithm, e.g. according to the AKA algorithm. Further, according to said process, the network identifies authenticator 230 for use in the further steps to authenticate and secure communication with user A. Exemplary, the functionalities 220, 230 may be BSF functionality according to the GAA structure or implemented in HSS/AuC in FIG. 1. Alternatively, the functionalities 220, 230 may be identified by reference obtained from the Subscriber Locator Function SLF indicated in FIG. 1.

The format identifier, exemplary provided in an access request 304, may alternatively be obtained from user profile information such as GBA User Security Setting, (GUSS), associated with the user identity ID-A, and retrieved from a user database (220, User DB) exemplary from network node HSS, at reception of the request 304.

In case the key Kx_ID-A, held by the user (User A), is no longer valid, the authentication will not succeed and the user has to attach to the gateway 240 to request a new key.

Figure 4:
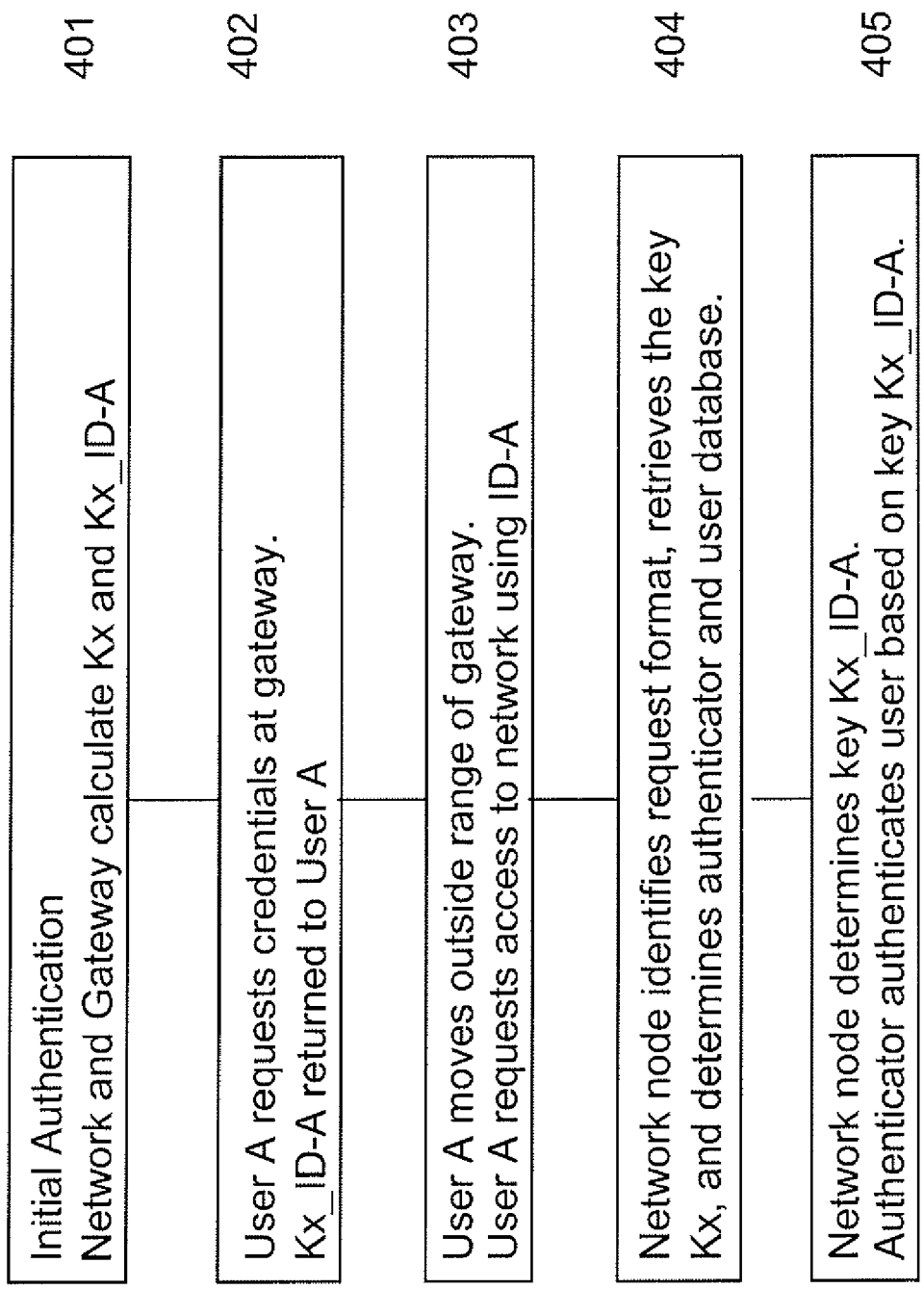
FIG. 4 is a flow chart showing basic steps according to a first embodiment of the invention.

FIG. 4 shows a flowchart according to the first embodiment. In step 401 the gateway and the network performs registration of identities ID-A, ID-B . . . and initial mutual authentication wherein a shared key Kx is calculated. Further, the network and the gateway calculate a key Kx_ID-A . . . for each registered identity ID-A . . . and store these entities linked to each other and to ID_HGW. In step 402 (User A) requests credentials at the gateway whereupon the gateway returns the key Kx_ID-A. In step 403 user (User A) moves outside range of the gateway and requests access to network providing the identity ID-A. In step 404 the network node identifies request format, retrieves the key Kx, and determines authenticator 230 and user database 220. In step 405 the network node determines the key Kx_ID-A either by calculation or retrieval of pre-stored key and the authenticator performs authentication of the user based on the key Kx_ID-A.

A second embodiment will now be described with reference to FIG. 6. According to this embodiment, a user entity UE, e.g. (User A), capable of establishing network access, is provided with credentials for access to a network application function (610, NAF). The network access may be through a mobile subscription or, alternatively, according to the first embodiment of this invention, through a WLAN access point, DSL, FTTH, WiMAX or by any other method for network access.

Figure 6:
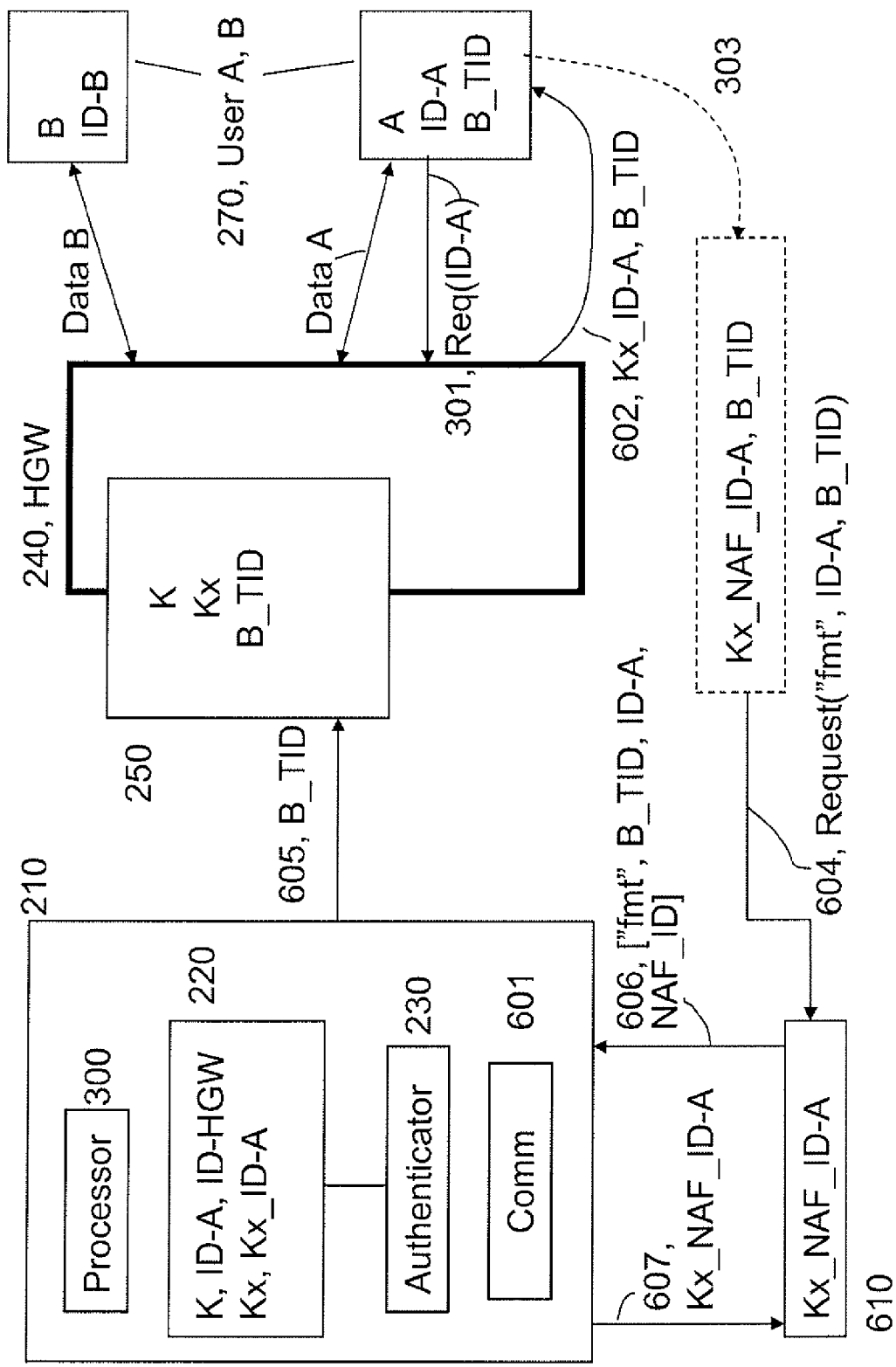
FIG. 6 is a schematic block diagram illustrating relationships between entities according to a second embodiment of the invention.

FIG. 6 is similar to FIG. 3 and like functional entities corresponds. It is noticed in FIG. 6 that the request 604 is now directed to a network application function (610, NAF) providing services. The authenticator 230 may be implemented as network functionality (BSF) according to the GAA standard as will be assumed in the remaining of this embodiment. The authenticator 230 is assigned a network domain name, "BSF_domain_name". It is apparent that the entities 220 and 230 can, at least partly, be integrated. As is seen in FIG. 6, a reference B_TID is initially calculated and delivered to the gateway at 605 wherein it is stored, exemplary in module 250. The reference B_TID identifies the authenticator 230 and allows for retrieval of the key Kx from the entity 220. In response to a request for a key by (User A) with identity ID-A, indicated at signal 301, the gateway (240, HGW) generates from the key Kx a new key kx_ID-A, and returns, at signal 602 the entities B_TID and Kx_ID-A to the requesting user. At 303 the (User A) moves out of range of the gateway 240 having now stored the key Kx_ID-A respectively reference B_TID.

Similar to the first embodiment a user, e.g. (User A), has registered at the gateway and has received a network identity ID-A.

In response to receiving the reference B_TID, user A derives a key Kx_NAF_ID-A for use in communication with a selected service application (610, NAF). At 604 the user (User A) makes a request for access to network application function (610, NAF) and includes in the request the reference B_TID, the identity ID-A, and a message format "fmt". At 606 the application (610, NAF) requests the key Kx_NAF_ID-A from the network providing the references B_TID, ID-A, its own identity NAF_ID, and the message format "fmt". Generally, as indicated in FIG. 6, the request message has the form ["fmt", B-TID, NAF_ID, ID-A], where square brackets denote that the individual parts indicated may be identified and separated from the message. The network 210, at reception of the request 606, extracts the references B_TID, identity ID-A, and format identifier "fmt". Having thus obtained the reference B_TID the network processing unit may process the request according to the format identifier "fmt" to retrieve the key Kx and, using the function $f$ previously shared with the gateway (240, HGW), to calculate Kx_ID-A, and further to calculate Kx_NAF_ID-A. The key Kx_NAF_ID-A is, thereafter, returned to the application (610, NAF) at 607.

The initial calculation of the key Kx may be based on an AKA. Recalling that the AKA authentication resulted in at least a key Ck and included a random value RAND and further recalling the general form of B_TID according to the GAA architecture, the reference B_TID may be written in the form of a network address identifier as: B_TID=RAND@BSF_domain_name.

Figure 7:
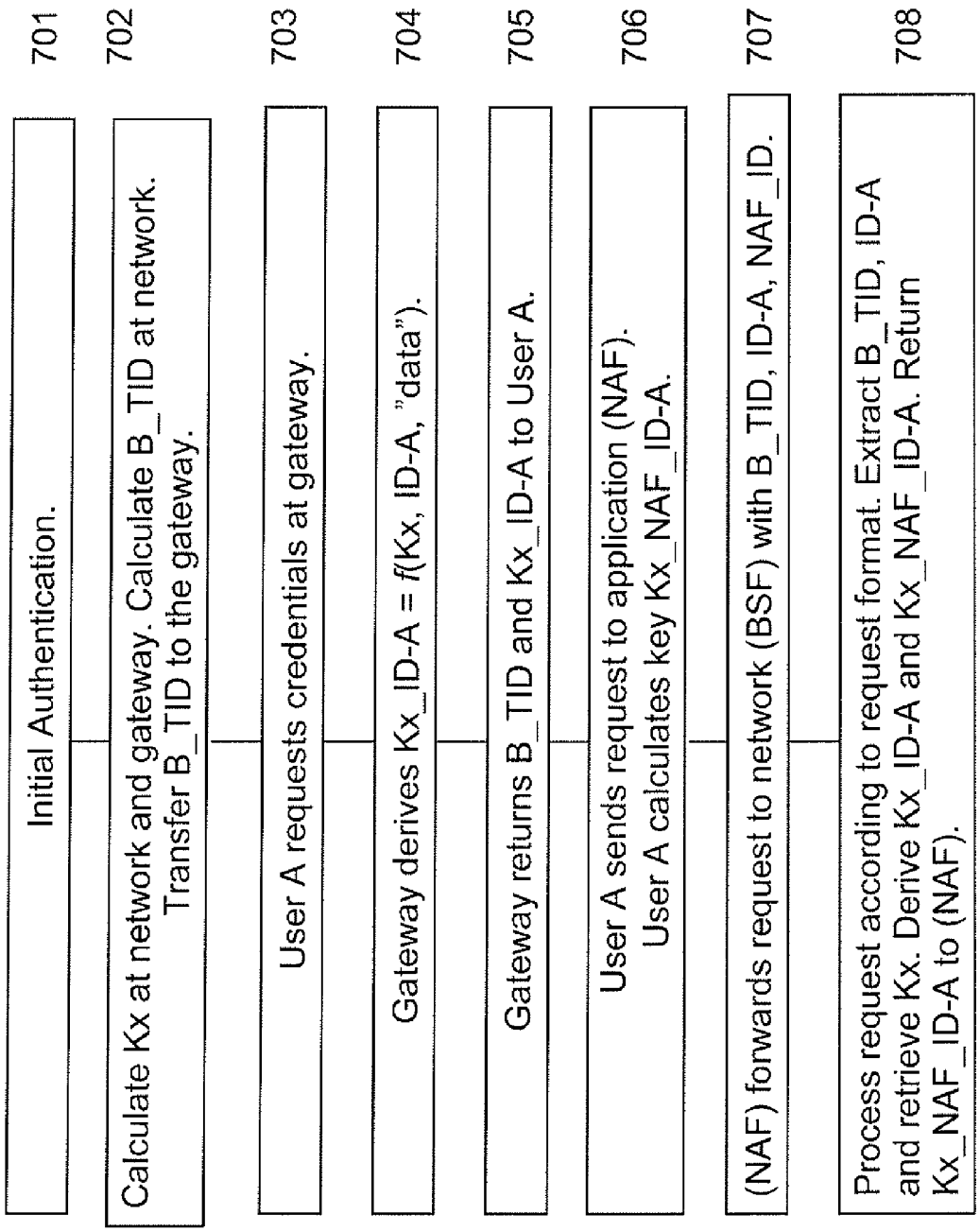
FIG. 7 is a flow chart showing basic steps according to the second embodiment.

With reference to FIG. 7, showing a flowchart of the inventive method, further details will now be given. FIG. 7 shows an exemplary implementation of the invention according to the GAA architecture.

Signaling at 701 relates to an initial mutual authentication and communication process. Exemplary the authentication is according to the UMTS AKA protocol. The initial UMTS authentication phase results in generation of at least the keys Ck, and Ik at the network and concurrently at the gateway (240, HGW).

At step 702 the network functionality BSF and the gateway 240 both calculate a key Kx exemplary according to the GAA standard, According to the standard, the key may be calculated as Kx=Ck||Ik where Ck and Ik are the ciphering respectively integrity keys resulting from the UMTS authentication process and "||" denotes concatenation. Further, the step 702 may include calculation of a reference B_TID from the random value RAND used in the calculation of the keys Ck, Ik. Specifically, according to the GAA standard B_TID may have the form of a network address identifier RAND@BSF_domain_name. The reference B_TID may be calculated by BSF and transferred to the gateway 240. Alternatively, if the entity BSF_domain_name is known the gateway may calculate B_TID as RAND is also known to the gateway from the initial authentication. Thus, as a result of steps 701 and 702, both the network and the gateway 240 will have the reference B_TID.

At 703, (User A) connects to the gateway 240 to request credentials for access to a network application function (610, NAF). In response to receiving the request for a key, the gateway (240, HGW) at step 704 calculates a key, as previously described, as Kx_ID-A=$f$(Ck, ID-A, "data") where $f$ is a function. Alternatively, a pre-stored key is retrieved from an identities database 260, (FIG. 3). The function $f$, as previously described, is also known to the network.

At 705 the key Kx_ID-A and the reference B_TID are returned to the requesting user entity over said connection. At this moment, the user (User A) has all information needed to request services from an application (710, NAF) and may disconnect from the gateway (240, HGW).

At step 706 the user entity prepares a request message to a selected network application function (710, NAF). Recalling the form of B_TID, according to the GAA standard (3GPP TS 33.220), the request message, according to one embodiment of the invention, includes modifying the reference B_TID to form B_TID'=<"fmt">||ID-A||B_TID wherein "fmt" is the message format identifier.

It is understood that numerous other modifications are possible that allows an addressed application (710, NAF) to identify format of a request message and to separate its individual parts. Generally, an application 610 may determine, from the format of the request, to invoke special procedures according to the invention.

Further in step 706 the user (User A) derives a key Kx_NAF_ID-A for future use as basis for communication with 710. In particular, the key may be calculated similar to the GAA specification (3GPP TS 33.220) as Kx_NAF_ID-A=KDF (Kx_ID-A, ID-A, NAF_ID, RAND, "other data") where RAND is the random value extracted from B_TID=RAND@BSF_domain_name and "other data" represents additional data. KDF is a key derivation function, e.g. according to the GAA standard. A difference to standard GAA specification is that, according to the invention, the key Kx_ID-A is used in place of Kx. Thus, according to the invention, a key will result that is individual for each user A with identity ID-A. Therefore, a key life-time may be defined for the key Kx_ID-A which is individual for each user and independent from the key Kx.

Finally, in step 706, the request is sent to the application 610 over a communication channel, exemplary over a cellular access or a WLAN access.

In step 707 the request message is forwarded to network functionality, exemplary BSF, including the application hostname NAF_ID, the reference B_TID, identity ID-A, and message format identifier "fmt". It is noticed that, according to the invention, the standard GAA interface Zn (see FIG. 1), has been modified to include the identity ID-A, and, implicitly or explicitly, a message format identifier <"fmt">. As mentioned above, the identity ID-A does not reveal the name of the user being assigned the identity ID-A. It is only the gateway that knows this relation.

At 708 the format of the message is first identified. The message format <"fmt"> indicates to the network to process the request message according to a specific routine. In particular, the reference B_TID is retrieved from the message identifying the entity 230. Other information in the message, e.g. RAND from B_TID and/or ID-A enables retrieval of the key Kx from the entity 220. Having the key Kx and the identity ID-A, the network, e.g. BSF, calculates the key Kx_ID-A=ƒ(Kx, ID-A, "data"). Alternatively, this key has been pre-calculated and pre-stored for retrieval at reception of the request. The key Kx_ID-A is, thereafter, used to calculate the key Kx_NAF_ID-A exemplary as described in step 706. The key Kx_NAF_ID-A is returned to the requesting application 610. At this point (User A) and NAF shares the key Kx_NAF_ID-A from which a shared service key may be derived for secure communication between the two entities.

In a third embodiment the gateway (240, HGW) is implemented in a mobile user entity having a *SIM-card and implementing e.g. the *SIM/AKA algorithm. The procedure is generally identical to that described in relation to FIG. 3.

Figure 8:
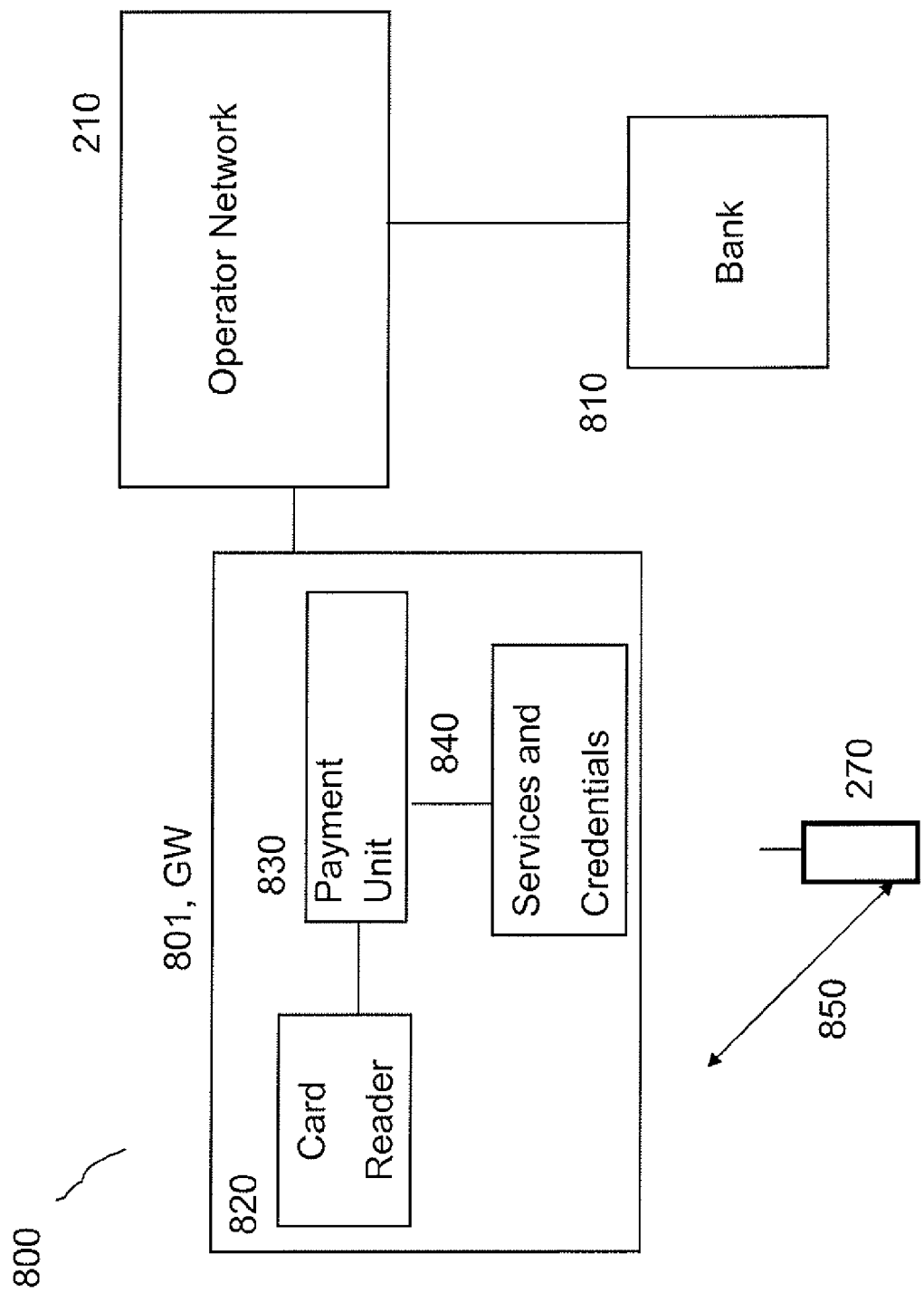
FIG. 8 is a schematic block diagram illustrating an embodiment of the invention implemented in a public environment.

In a fourth embodiment, illustrated in FIG. 8, the gateway (801, GW) is implemented at a public place whereby credentials for access to services may be obtained at payment. A user may connect to the gateway (801, GW) using e.g. short range radio, e.g. Bluetooth™ and select from a list of available services. Using a credit card the user may authorize the bank (810) to pay the operator and/or service providers a specified fee for the selected services. Upon fulfilled payment, the gateway (801, GW) provides the user with the appropriate credentials according to first and/or second embodiments described above. It is assumed that administrator of the gateway 801 has a subscription with an operator 210. The gateway 801 has a card reader (820), a payment unit (830), and a services and credentials unit (840). A user having a mobile user entity 280 establishes communication 850 with the gateway (801, GW) and receives, exemplary from a services and credentials unit 840, a list of selectable services and service costs. Upon selection of services the user is requested to pay the costs. Using the credit card reader 820, the payment unit 830 recognises the bank 810 and establishes communication between the user and the bank through the operator 210. The user authenticates using e.g. a PIN code and executes payment. The bank verifies to the payment unit 830 fulfilment of payment and provides a user identity or pseudonym whereby the services and credentials unit 840 is ordered to generate and download the appropriate credentials according to previous embodiments.

Figure 5:
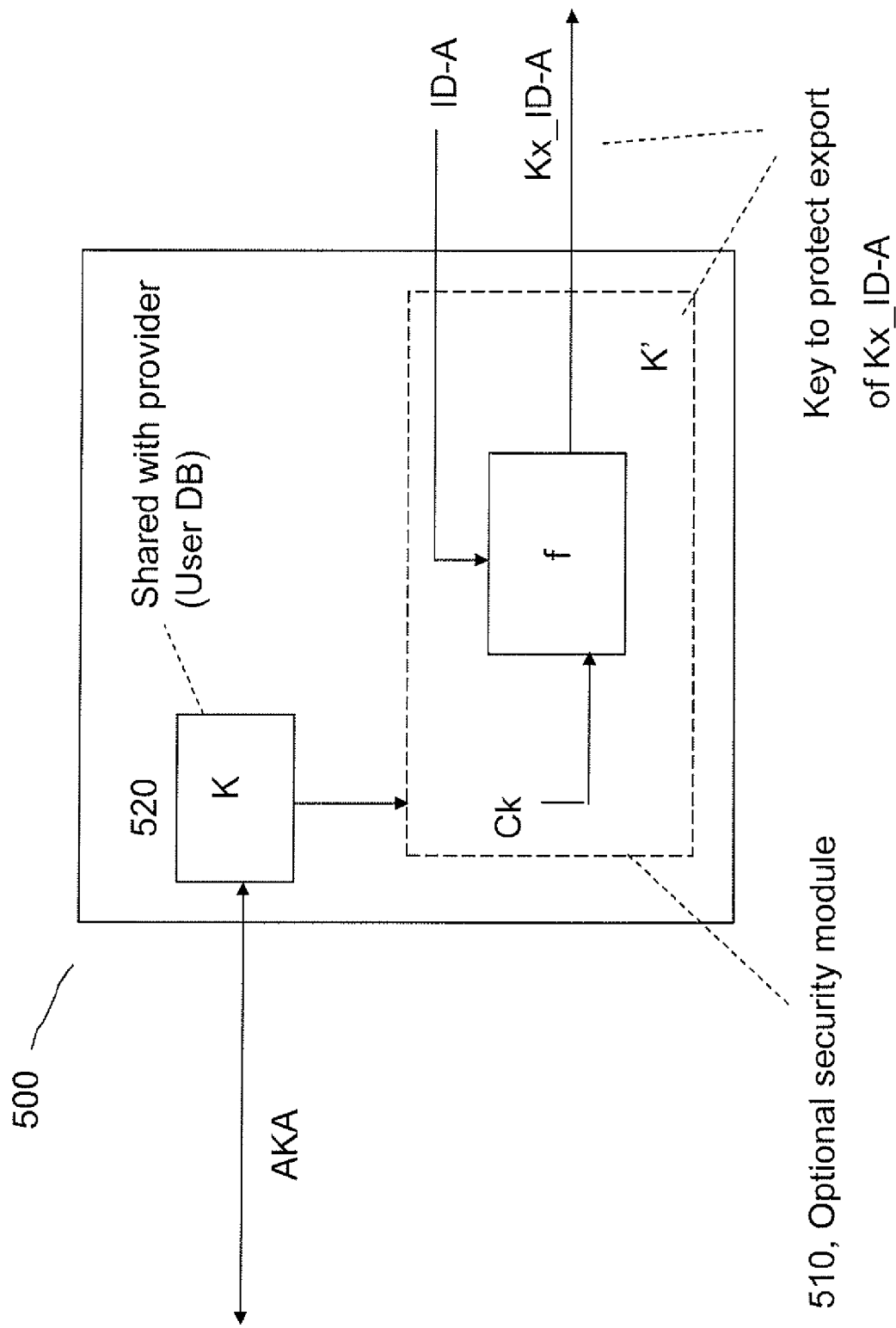
FIG. 5 is a block diagram illustrating an alternative embodiment of the invention.

An alternative embodiment is illustrated in FIG. 5 wherein there is an additional tamper resistant module (510) implemented at the gateway (240, HGW). The additional module 510 includes a secret key K'. The module 510 further implements the function ƒ for derivation of the key Kx_ID-A. If a user terminal is equipped with a security module including a secret key, K', a shared key may be negotiated between the user entity and the gateway (240, HGW) exemplary for protecting the transfer of data in the download process between the gateway 240 and a user, e.g. for protection of the key Kx_ID-A during download.

The invention, having thus been described, advantageously provides personalised services and security features to a user group, having a group subscription with an operator, whether its members operate behind a gateway or move out of its range as roaming users.

An advantage of the invention is that a user, not previously having a basic subscription, may receive temporary access to services in a secure way with aid of downloaded credentials.

Another advantage is that a user in a visited network may be provided with credentials as a temporary subscriber in that network such that communication can be established with other subscribers in that network without costly detouring through a home network. The user may receive the required credentials from a public gateway exemplary by paying a specified fee.

An advantage is that the method and arrangement, according to the invention, may allow operators to increase network traffic and to be better positioned in the business value chain as a channel provider for extended provisioning of services.

Having thus described by way of example detailed embodiments of the invention it is readily understood that numerous variations are allowed without departing from the scope of the invention which is defined by the accompanying claims.

What is claimed is:

1. A method for providing a user entity with credentials for access to services in a communications network node, the method comprising the steps of:
   authenticating a gateway with the communications network node, where a result of the authentication is creation of a subscription based first key and a second key obtained from gateway authentication using the first key, a value, and shared algorithms, where both the gateway and the communications network node store the first key and the second key;
   registering a user identity of the user entity being associated with the subscription in the communications network node and the gateway;
   creating, at the gateway and at the communications network node, a user key, linked to the user identity, by applying a function, shared between the communications network node and the gateway, to the second key, the user identity, and other input parameters such that the user key is the function of the second key, the user identity and the other input parameters;

downloading from the gateway to the user entity a security package, including the user key; and the user entity sending a request for access to network services, the request including the user key and an indication of request format.

2. The method according to claim 1, wherein prior to the step of downloading, the user entity establishes a trusted communication with the gateway using underlying security arrangement based on additional secret keys implemented in an additional tamper resistant module at respectively the gateway and the user entity.

3. The method of claim 2, wherein the security arrangement is at least partly based on a MANA, WPA, or UPnP protocol.

4. The method of claim 1, wherein the user identity is provided the gateway in an initial phase.

5. The method of claim 1, wherein the user identity is generated at the communications network node and provided to the gateway in an initial phase.

6. The method according to claim 4, wherein the user identity is derived from the identity of the gateway.

7. The method of claim 6, wherein the user identity is a public identity MSISDN or IMPU.

8. The method according to claim 1, wherein the downloaded security package comprises a soft identity module implemented in an application environment of a tamper-resistant hardware identity card.

9. The method according to claim 1, wherein the network services comprises network access services and wherein said indication of request format comprises a format identifier, wherein:

the format identifier determines method for processing the request at least including the further steps of:

the communications network node retrieving the user key;

the communications network node, determining an authentication functionality;

the authentication functionality performing authentication of the user entity based on the user key.

10. The method according to claim 1, wherein the access concerns access to a network application function having an identity and wherein a reference to the second key has additionally been generated in the initial phase and transferred to the gateway, wherein the step of accessing network services further comprises the steps:

in the step of downloading including the reference;

the user entity forming a first request message directed to the network application function, the message including a format identifier, indicative of the request format, and at least the user identity and the reference;

the network application function, in response to receiving the first request message, forming a second request message for request at the communications network node for a key for secure communication with the user entity the second request at least including the identity of the network application function, the format identifier, the user identity and the reference;

the communications network node processing the second request according to the format identifier thereby extracting the user identity and the reference, determining the second key and calculating the user key;

calculating at the communications network node and at the user entity a third key using a key derivation function of the user key, user identity, the identity of the network application function, the value and other data;

the communication network node returning the third key to the network application function;

the user entity and the network application function establishing communication based on the third key.

11. The method according to claim 1, wherein the user key has a specified lifetime independent of the lifetime of the second key.

12. A gateway comprising:

an identity module configured to authenticate the gateway with communications network node, where a result of the authentication is creation of a subscription based first key and a second key obtained from gateway authentication using the first key, a value, and shared algorithms, where both the gateway and the communications network node store the first key and the second key;

an identity database configured to determine a user identity;

logic configured to generate a modified user key linked to the user identity by applying a function shared with the communications network node, to the second key, the user identity and other data such that the modified user key is the function of the second key, the user identity and other data, and a communication device configured to establish trusted communication with a user entity associated with the user identity for transfer of at least the modified user key.

13. A communications network node comprising:

a processor configured to authenticate the communications network node with a gateway, where a result of the authentication is creation of a subscription based first key and a second key obtained from gateway authentication using the first key, a value, and shared algorithms, where both the gateway and the communications network node store the first key and the second key;

a communication device configured to receive a request message and extracting there from at least a format identifier and a user identity associated with the gateway subscription;

the processor configured to process the request message in dependence of said format identifier;

the processor configured to calculate a user key linked to the user identity by applying a function, shared with the gateway, to said second user key, the user identity and additional input parameters such that the user key is the function of the second key, the user identity and the other input parameters, and an authenticator configured to authenticate a user based on the user key.

14. The communications network node according to claim 13 wherein said extracting further comprises extracting a value comprising:

said means for processing includes calculation of the key using the value and a subscription based shared key.

15. A user entity with a user identity, not previously having a subscription with an operator for access to network services, comprising:

means for securely downloading from a gateway a soft identity module including at least a user key;

means for deriving from the user key a key for access to network services;

means for sending an access request to a communications network node including the user key or the derived key, the request indicating a request format, where the gateway generated the user key by authenticating the communications network node, where a result of the authentication is a creation of a subscription based first key and a second key obtained from gateway authentication using the first key, a value, and shared algorithms, where both the gateway and the communications network node store the first key and the second key, and applying a function, shared between the communications network node and the gateway, to the second key, the user identity, and other input parameters to create the user key such that the user key is the function of the second key, the user identity and the other input parameters.

16. A method for providing a user entity, not previously having a subscription with a network operator, with credentials for access to services in a communications network node wherein a gateway and the communications network node share a subscription based first key and a second key obtained from gateway authentication using the first key, a value, and shared algorithms, the method comprising the steps of:
registering a user identity being associated with the subscription in the communications network node and the gateway;
creating, at the gateway and at the communications network node, a user key, linked to the user identity, by applying a function, shared between the communications network node and the gateway, to the second key, the user identity, and other input parameters such that the user key is the function of the second key, the user identity and the other input parameters;
downloading from the gateway to the user entity a security package, including the user key;
the user entity sending a request for access to network services, the request including the user key and an indication of request format;
wherein the access concerns access to a network application function having an identity and wherein a reference to the second key has additionally been generated in the initial phase and transferred to the gateway, wherein the step of accessing network services further comprises the steps:
in the step of downloading including the reference;
the user entity forming a first request message directed to the network application function, the message including a format identifier, indicative of the request format, and at least the user identity and the reference;
the network application function, in response to receiving the first request message, forming a second request message for request at the communications network node for a key for secure communication with the user entity the second request at least including the identity of the network application function, the format identifier, the user identity and the reference;
the communications network node processing the second request according to the format identifier thereby extracting the user identity and the reference, determining the second key and calculating the user key,
calculating at the communications network node and at the user entity a third key using a key derivation function of the user key, user identity, the identity of the network application function, the value and other data;
the communication network node returning the third key to the network application function; and
the user entity and the network application function establishing communication based on the third key.

17. A method in a gateway method for providing a user entity with credentials for access to services in a communications network node, the method implemented by a gateway node comprising the steps of:
authenticating with the communications network node, where a result of the authentication is creation of a subscription based first key and a second key obtained from gateway authentication using the first key, a value, and shared algorithms, where both the gateway and the communications network node store the first key and the second key;
determining a user identity;
generating a modified user key linked to the user identity by applying a function shared with the communications network node, to the second key, the user identity and other data such that the modified user key is the function of the second key, the user identity and other data, and
establishing trusted communication with the user entity associated with the user identity for transfer of at least the modified user key.

18. A method in a communications network node for authenticating a user entity, the method implemented by the communications network node comprising the steps of:
authenticating with a gateway, where a result of the authentication is creation of a subscription based first key and a second key obtained from gateway authentication using the first key, a value, and shared algorithms, where both the gateway and the communications network node store the first key and the second key;
receiving a request message and extracting there from at least a format identifier and a user identity associated with the gateway subscription;
processing the request message in dependence of said format identifier;
calculating a user key linked to the user identity by applying a function, shared with the gateway, to said second user key, the user identity and additional input parameters such that the user key is the function of the second key, the user identity and the other input parameters, and
authenticating a user based on the user key.

19. A method in a user entity for requesting access to services in a communications network node, the method implemented by the user entity comprising the steps of:
securely downloading from a gateway a soft identity module including at least a user key;
deriving from the user key a key for access to network services;
sending an access request to the communications network node including the user key or the derived key, the request indicating a request format, where the gateway generated the user key by authenticating the communications network node, where a result of the authentication is a creation of a subscription based first key and a second key obtained from gateway authentication using the first key, a value, and shared algorithms, where both the gateway and the communications network node store the first key and the second key, and applying a function, shared between the communications network node and the gateway, to the second key, the user identity, and other input parameters to create the user key such that the user key is the function of the second key, the user identity and the other input parameters.

* * * * *

UNITED STATES PATENT AND TRADEMARK OFFICE
CERTIFICATE OF CORRECTION

PATENT NO. : 8,261,078 B2  Page 1 of 1
APPLICATION NO. : 12/303342
DATED : September 4, 2012
INVENTOR(S) : Barriga et al.

It is certified that error appears in the above-identified patent and that said Letters Patent is hereby corrected as shown below:

Title Page, Item (56), under "OTHER PUBLICATIONS", in Column 2, Line 1, delete "Generaton" and insert -- Generation --, therefor.

On the Face Page, in the Figure, delete "  " and insert --  --, therefor.

In Fig. 2, Sheet 2 of 8, delete "  " and insert --  --, therefor.

In Column 4, Line 21, delete "GM" and insert -- GAA --, therefor.

In Column 5, Line 36, delete "structure," and insert -- structure. --, therefor.

In Column 14, Line 52, in Claim 14, delete "13" and insert -- 13, --, therefor.

Signed and Sealed this
Twenty-ninth Day of January, 2013

David J. Kappos
*Director of the United States Patent and Trademark Office*